3,051,708
PRODUCTION OF CYANURIC ACID
Karl Merkel and Albert Palm, Ludwigshafen (Rhine), Germany, assignors to Badische Anilin- & Soda-Fabrik Aktiengesellschaft, Ludwigshafen (Rhine), Germany
No Drawing. Filed Apr. 29, 1960, Ser. No. 25,514
Claims priority, application Germany Apr. 3, 1958
6 Claims. (Cl. 260—248)

This invention relates to a new and improved process for the production of cyanuric acid by heating urea in a liquid.

In the production of cyanuric acid by heating molten urea, if desired in the presence of zinc chloride, ammonium chloride or other catalysts, a grey product is obtained which is highly contaminated by by-products. These impurities are less if, in accordance with a known process, the urea is introduced and finely dispersed in hot liquids, such as molten paraffin wax, paraffin oil, molten natural wax or tetrachlorbenzene, which do not dissolve or attack urea or cyanuric acid at a temperature at which cyanuric acid forms. The urea is thereby heated very rapidly and the formation of by-products is restricted. The extent to which the formation of by-products is suppressed is however insufficient. Furthermore, in continuous operation, the liquids are cracked in the course of time with the formation of low-boiling compounds which distil off, and with the formation of difficulty volatile compounds which contaminate the cyanuric acid.

By the said process there is obtained a crude cyanuric acid of which the purity may vary between about 92% and about 47%, for example, a 92% cyanuric acid being obtained in a yield of about 79% of the theory. This degree of purity is not sufficient for certain purposes, for example the production of trichlorocyanuric acid. Cyanuric acid to be used for such purposes must first be purified, for example, by recrystallization from water or organic solvents.

One object of the invention is to provide in superior yields a very pure cyanuric acid from urea. Another object of the invention is to provide a process for the production of cyanuric acid from urea by using substances which are highly stable under the conditions of the reaction. Still another object of the invention is to provide a process for the production of cyanuric acid from urea wherein the urea may be used in either the solid or molten state.

In the practice of our invention these objects are achieved by introducing solid or molten urea into a hot liquid which substantially consists of diphenyl or diphenyl oxide or a corresponding compound containing up to two chlorine or bromine substituents in each of the phenyl nuclei, the temperature of the said liquid being maintained at 220° to 300° C. We prefer to introduce the urea in the solid state to avoid the additional operation of melting. The weight ratio of the urea to the hot liquid may be varied within wide limits, the preferred ratio being from 0.2 to 5 parts of urea to 1 part of liquid. The period of time given to the introduction of the urea into the liquid may also be varied, for example from 25 minutes to 10 hours. By carrying out the production of cyanuric acid in a diphenyl compound in the manner described, colorless cyanuric acid is obtained in a yield of at least 95% of the theory and a purity of at least 95%.

Diphenyl, diphenyl oxide and the said halogen substitution products have the further advantage that they do not undergo change at a temperature between 220° and 300° C. even over a prolonged period of time in continuous operation.

Mixtures of the said high-boiling liquids may also be used, any relative proportions in the mixture being possible. It is advantageous to use mixtures of which the melting range lies at about room temperature, since liquids are easier to handle than solids. For example, containers can more easily be filled or emptied when liquids are used. Mixtures of which the melting range lies at about room temperature can be obtained, for example, from diphenyl or diphenyl oxide and a halogen diphenyl or a halogen diphenyl oxide. For example, a mixture of 80% of diphenyl oxide and 20% of diphenyl has a melting range of about 18° to 20° C.

The temperature range which is preferred for the production of cyanuric acid in accordance with the present process is about 220° to about 300° C., and it is advantageous to work at 240° to 270°. Below 220° C. and above 300° C., by-products are formed which contaminate the cyanuric acid too greatly. The reaction is preferably carried out at atmospheric or reduced pressure and in continuous or discontinuous operation. Reaction at slightly elevated pressure is also possible. However, when elevated pressure is applied, there exists the danger that the cyanuric acid becomes increasingly contaminated with melamine. By choosing the reaction temperature in the vicinity of the boiling point of the liquid used under the pressure employed, clogging of the distillation column, through which the ammonia formed by the reaction is withdrawn, is avoided, because the condensate reflux formed therein rinses back into the reaction vessel any substance sublimed into the distillation column.

In order to achieve sufficient reflux in the distillation column it is not necessary that the liquid should be heated to the boil. In the production of cyanuric acid, formation of gases, i.e. ammonia and carbon dioxide, occurs even at temperatures below the boiling point of the liquid, and the gas bubbles which rise in the column entrain vapor.

If the diphenyl compound employed boils above the preferred upper temperature limit of 300° C., the pressure may be reduced in order to lower the boiling point below 300° C. For example, diphenyl boils at about 254 to 255° C. at 760 mm. Hg, diphenyl oxide (diphenyl ether) at about 259° C. at 760 mm. Hg, 2-bromo-diphenyl at about 296 to 298° C. at 760 mm. Hg, 4-bromo-diphenyl at about 310° C. at 760 mm. Hg, 2-chloro-diphenyl at about 273 to 274° C. at 760 mm. Hg, 3-chloro-diphenyl at about 284 to 285° C. at 760 mm. Hg, 4-chloro-diphenyl at about 291° C. at 745 mm. Hg, 4,4'-dichloro-diphenyl at about 355 to 360° C. at 760 mm. Hg. The boiling ranges of the mixtures can easily be calculated from the boiling points of the components, since these compounds do not form azeotropic mixtures.

The following examples will further illustrate this invention, but the invention is not restricted to these examples. The parts specified in the examples are parts by weight.

*Example 1*

800 parts of a mixture of the isomers of the three monochlorodiphenyls of the boiling range 270–275° C. (such as is obtained by technical chlorination of diphenyl) is mixed with 200 parts of diphenyl oxide in a heated container provided with a distillation column and a dephlegmator. While stirring vigorously, there is then allowed to flow in at a reaction temperature of 250° C. and a pressure of 700 mm. Hg, at which the boiling range is 260–265° C., 900 parts of molten urea during the course of seven hours. 250 parts of ammonia is evolved. The cyanuric acid formed is then separated from the bulk of the liquid by filtration. The remainder of the liquid adhering to the cyanuric acid is removed by heating to 160° C. at a pressure of 5 mm. Hg.

630 parts (97.5%) of 98% pure cyanuric acid is obtained. The product is colorless.

Similar results are obtained by using, in the form of heated liquids, diphenyl, chlorination products of diphenyl oxide, a mixture of 80% of diphenyl oxide and 20% of diphenyl (melting range of the mixture 18–20° C.) and working under the conditions described in Example 1.

*Example 2*

700 parts of diphenyl oxide is charged into a container provided with a distillation column and a dephlegmator. Then at a reaction temperature of 258° C. and atmospheric pressure, 540 parts of molten urea per hour is allowed to flow in while stirring well. 382 parts (97%) per hour of cyanuric acid is recovered by continuous withdrawal of the suspension from the container and separation of the cyanuric acid in a centrifuge. The diphenyl oxide flowing from the centrifuge is returned to the container. The cyanuric acid is freed from the last traces of diphenyl oxide by steam distillation. The diphenyl oxide thus separated also flows back into the container. The cyanuric acid obtained by this process is colorless and has a purity of 98%. If the small losses of diphenyl oxide, which occur although the diphenyl oxide is largely recycled, are made up by adding fresh diphenyl oxide, no deterioration of the diphenyl oxide or of the quality of the cyanuric acid can be observed even after 2,000 hours of continuous operation.

*Example 3*

100 g. of diphenyl and 2 g. of a wetting agent of the alkylsulfonate type is heated to a temperature between 200 and 235° C. in a vessel of 1.5 liters capacity provided with a reflux condenser and a stirrer. To the hot mixture there are added over a 2¼ hour period while stirring 100 g. of granular urea. After all of the urea has been added, the solid substance is filtered off from the solution, slurried in toluene, again filtered, slurried in water at 20° C., filtered once more and then dried at 100° C.

There are obtained 68 g. of cyanuric acid in the form of a white powder. That is a yield of 95% of the theory. The product has the following composition—
Found: C, 28.1%; H, 2.5%; O, 37.0%; N, 32.8%.
Calculated for $C_3H_3O_3N_3$: C, 27.9%; H, 2.4%; O, 37.2%; N, 32.6%.

*Example 4*

100 g. of diphenyl and 2 g. of a wetting agent of the alkylsulfonate type is heated in the vessel used in the previous example to a temperature between 200 and 235. To the hot mixture there are added in portions over a 2¼ hour period while stirring 100 g. of molten urea in such a way that the individual portions are melted shortly before they are run into the hot solution. After all of the urea has been added, the solid substance is filtered off from the solution, slurried in toluene, again filtered, slurried in water at 20° C., filtered once more and then dried at 100° C.

There are obtained 68 g. of syanuric acid in the form of a white powder. That is a yield of 95% of the theory.

The product has the following composition—
Found: C, 27.8%; H, 2.5%; O, 37.3%; N, 32.8%.
Calculated for $C_3H_3O_3N_3$: C, 27.9%; H, 2.4%; O, 37.2%; N, 32.6%.

*Example 5*

2,700 parts of diphenyl oxide are fed into a container equipped with a homogenizing device and a rectifying column with dephlegmator, and heated to 260° C. 540 parts of molten urea are sprayed into the container over a period of 25 minutes and finely dispersed in the hot diphenyl oxide, the temperature being maintained at between 250° and 260° C. When all of the urea has been added, the reaction mixture is maintained at the said temperature for another 5 minutes. After cooling, the diphenyl oxide is separated from the cyanuric acid by centrifuging, any remainders of diphenyl oxide being removed by vacuum distillation.

There are obtained 377 parts of colorless pure cyanuric acid.

*Example 6*

500 parts of diphenyl are placed in a container of the type described in Example 5, and heated to 255° C. 540 parts of molten urea are added to the diphenyl charge over a period of 1 hour and emulsified in the liquid. The cyanuric acid formed is then separated from the bulk of the liquid by filtration. The remainder of the liquid, which adheres to the cyanuric acid is removed by vacuum distillation.

There are obtained 374 parts of colorless pure cyanuric acid.

*Example 7*

320 parts of diphenyl are placed in a container of the type described in Example 5 and heated to 255° C. 1,600 parts of granulated urea are added to the diphenyl charge over a period of 10 hours while thoroughly homogenizing the reaction mixture, and finely dispersed therein. The cyanuric acid formed is then separated from the bulk of the diphenyl by centrifuging. The remainder of the liquid which adheres to the cyanuric acid is removed by vacuum distillation.

There are obtained 1,120 parts of colorless pure cyanuric acid.

This application is a continuation-in-part of our application Serial Number 798,335, filed March 10, 1959, now abandoned.

We claim:

1. In a process for the production of cyanuric acid by heating urea in an inert liquid, the improvement which comprises introducing urea into a hot liquid medium consisting essentially of at least one diphenyl compound selected from the group consisting of diphenyl, diphenyl oxide and the same compounds containing up to two halogen substituents selected from the group consisting of bromine and chlorine in each of the phenyl nuclei, said hot liquid being maintained at a temperature of from 220° C. to 300° C. and being heated to said temperature prior to the introduction of said urea.

2. The improved process as claimed in claim 1 wherein the hot liquid is maintained at a temperature of from about 240° C. to 270° C.

3. The improved process as claimed in claim 1 wherein the hot liquid is maintained at a temperature within said temperature range and under a pressure such that the liquid is about at its boiling point.

4. The improved process as claimed in claim 1 wherein the urea is introduced over a period of from 25 minutes to 10 hours.

5. The improved process as claimed in claim 1 wherein from 0.2 to 5 parts of urea are introduced for every part of hot liquid medium.

6. In a process for the production of cyanuric acid by heating urea in an inert liquid, the improvement which comprises heating a liquid medium consisting essentially of at least one diphenyl compound selected from the group consisting of diphenyl, diphenyl oxide and the same compounds containing up to two halogen substituents selected from the group consisting of bromine and chlorine in each of the phenyl nuclei to a temperature of from about 220° C. to 300° C., and while maintaining said temperature introducing urea over a period of about 25 minutes to 10 hours into the hot liquid medium, a total of from 0.2 to 5 parts of said urea being introduced for every part by weight of said liquid medium.

References Cited in the file of this patent

UNITED STATES PATENTS

| | | |
|---|---|---|
| 2,822,363 | Christmann et al. | Feb. 4, 1958 |
| 2,872,447 | Oehlschlager | Feb. 3, 1959 |
| 2,952,679 | Perret | Sept. 13, 1960 |

FOREIGN PATENTS

| | | |
|---|---|---|
| 506,070 | Canada | Sept. 28, 1954 |